March 1, 1949. J. P. SAPP 2,463,121
VEHICLE WHEEL ASSEMBLY AND MOUNTING
Filed Aug. 21, 1945 2 Sheets-Sheet 1
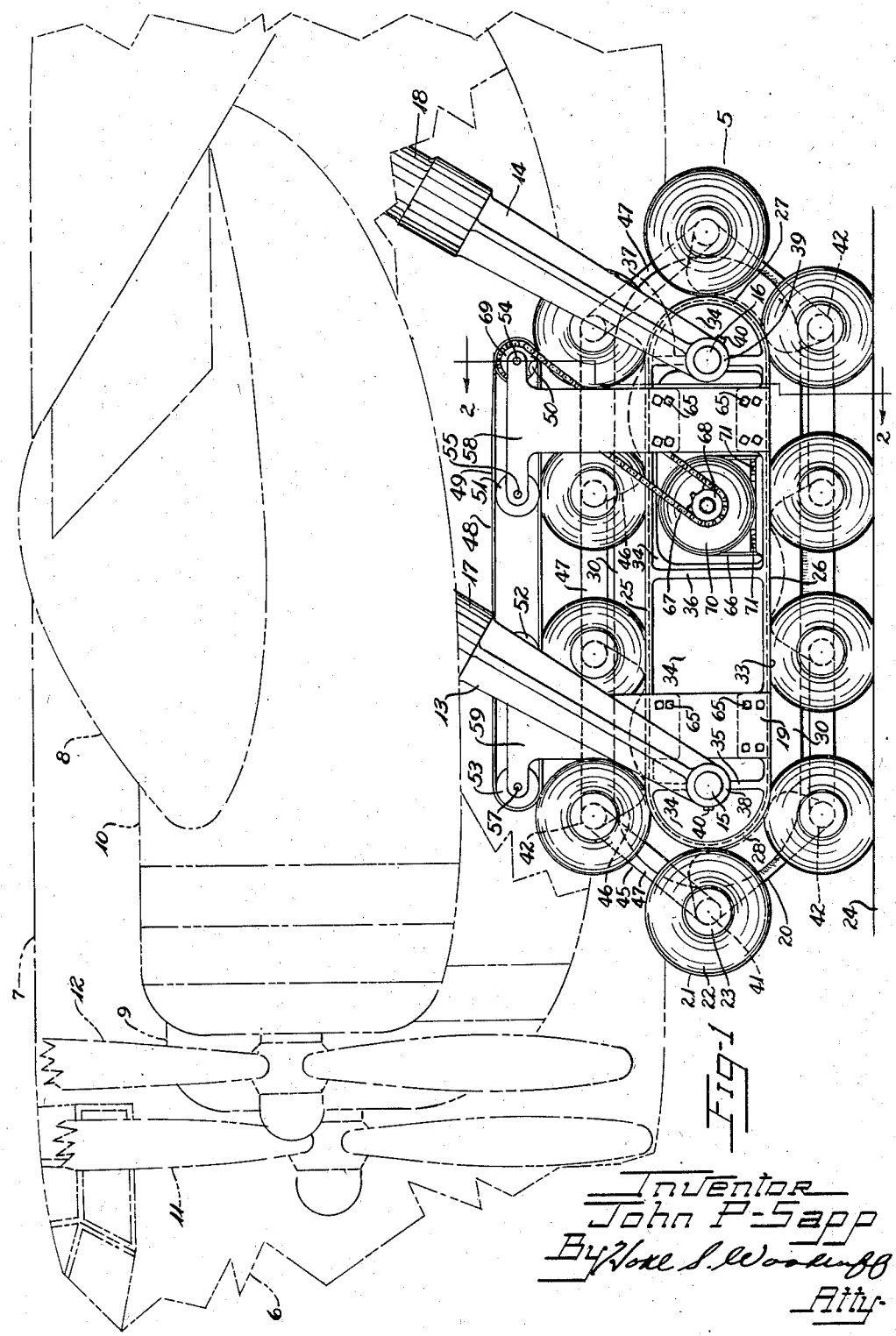
Inventor
John P. Sapp

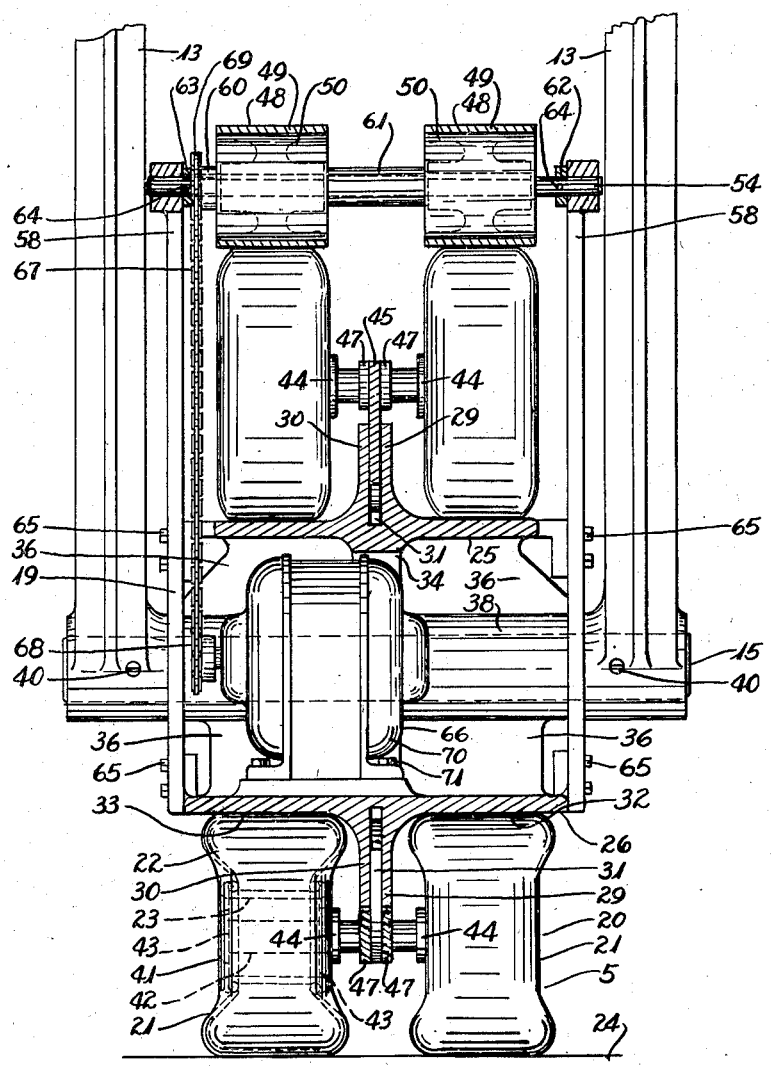

Patented Mar. 1, 1949

2,463,121

UNITED STATES PATENT OFFICE 2,463,121

VEHICLE WHEEL ASSEMBLY AND MOUNTING

John P. Sapp, Kent, Ohio, assignor to The B. F. Goodrich Company, New York, N. Y., a corporation of New York Application August 21, 1945, Serial No. 611,794

6 Claims. (Cl. 244—103)

The invention relates to wheel assemblies and mountings for vehicles and especially to such wheel assemblies and mountings for aircraft landing-gear purposes.

Large aircraft such, for example, as long-range bomber and transport airplanes capable of carrying heavy loads generally impose severe load-shocks on their landing-gear even under favorable conditions, when landing on the ground or surfaced runways at airfields. Such landing-gear for an aircraft have included one or more relatively large single or dual-wheel and pneumatic tire assemblies in association with strut mechanisms for taxiing and for withstanding especially the landing shocks, and the several assemblies may be widely spaced-apart relative to each other for stability of landing purposes. The pneumatic tires being generally inflated to high pressures to resist and partially absorb the load-shocks promote undesirable harshness of landing and riding qualities of the airplane and impart to the runways objectionable localized stresses of substantial magnitude at the regions of ground-contact of the tires tending to break the surfacing of such runways. Also, under deflection due to load, the high-pressure tires each have a single ground-contact area of relatively limited extent facilitating the sinking of the wheel assemblies into soft ground and the skidding of the tires under braking action, both of which sinking and skidding are objectionable and may be dangerous to the safety of the airplane. Such large tires are generally of expensive construction and the lack of satisfactory prerotation of the same prior to landing of the airplane, which prerotation is difficult to obtain due to their large size and mass, causes rapid wear due to scuffing and abrasive action and failure of the tires within a comparatively short time.

Objects of the invention are to provide for resiliently transmitting the load at a vehicle wheel assembly and distributing such load to a supporting surface or ground over an extended area of such surface; to provide for resiliently cushioning or springing a vehicle at such wheel assembly by two-way or opposed cushioning actions effected at each wheel of a plurality of spaced-apart wheels of the assembly; to provide for motion of translation of the wheels relative to the vehicle and the supporting surface; to provide for said transmitting the load and cushioning the vehicle at the wheel assembly coincidental with said motion of translation of the wheels; to provide for substantial inherent shock-absorbing, impact-load and load-carrying capacity; to provide for increased safety of operation of the vehicle; to provide for rotatively driving the wheels of the assembly in a manner to effect motion of translation of the vehicle in the fore or aft direction; and to provide for simplicity and ruggedness of construction and effectiveness of operation.

More specific objects of the invention are to provide an improved wheel assembly and mounting for the landing-gear of aircraft; to provide for transmitting and distributing the load at the landing-gear wheel assembly through resilient means to the supporting surface or ground at a plurality of spaced-apart regions of such surface; to provide for two-way opposed cushioning deflection of each resilient element of a plurality of spaced-apart ground-contacting resilient elements of the wheel assembly; to provide for pre-rotation of the wheels prior to landing of the aircraft; to provide for braking the wheel assembly; to provide for motion of translation of an endless cushioning structure including a series of spaced-apart wheels relative to the aircraft and/or the supporting surface or ground; to provide for resisting sinking of the landing-gear wheel assembly into soft ground; to provide for improved resistance to skidding of the aircraft, especially during landing operations; to provide for rotatively driving the wheels and an automatic-clutch action for such wheels; and to provide for accommodating the wheel assembly to the flight attitude of the aircraft during landing.

These and other objects and advantages of the invention will be apparent from the following description.

In the accompanying drawings which form a part of this specification and in which like numerals are employed to designate like parts throughout the same.

Fig. 1 is a side elevation of a wheel assembly and mounting for an aircraft landing-gear constructed in accordance with and embodying the invention, parts being broken away, the aircraft being shown in broken lines.

Fig. 2 is a sectional view taken along line 2—2 of Fig. 1.

In the illustrative embodiment of the invention shown in the drawings, the construction includes a wheel assembly 5 having an endless cushioning structure of peripherally spaced-apart and movable resilient rotating elements as applied to landing gear of an aircraft 6, which aircraft may be of the long-range or transport type airplane. Such airplane 6 includes a fuselage 7 and a wing 8 with spanwise spaced-apart engine nacelles 9, 10 housing engines (not shown) for rotating propellers 11, 12. One or more wheel assemblies 5 may be provided for the landing-gear which, for example, may be of the known tricycle or other type. For the arrangement shown, the wheel assembly is desirably retractable and positionable within the engine nacelle 9.

The wheel assembly 5 may be carried by the aircraft as by one or more strut means and preferably by bifurcated struts 13, 14 spaced-apart in the fore and aft direction of and desirably forwardly inclined relative to the aircraft or, if desired, the strut means may include a pair of transversely spaced-apart strut elements at each of the fore and aft positions occupied by the bifurcated struts 13, 14. The respective struts 13, 14 at their tines are preferably pivotally connected to and mounted on the wheel assembly 5 at shafts 15, 16 and to the aircraft 6 by suitable pivotal connecting means at the engine nacelle 9 in a manner to effect the desired retraction of the wheel assembly and struts and to facilitate positioning the wheel assembly 5 relative to the fuselage 7 such that smooth landing and minimum "nosing-over" tendency of the aircraft 6 are promoted. Each strut 13, 14 is desirably provided with a suitable fluid-operated shock-absorber 17, 18 of known construction for cooperating with the cushioning wheel assembly 5 especially in absorbing severe shock-loads and impacts during landing operation of the aircraft.

The wheel assembly 5 includes supporting body means or a supporting frame 19 carried by the struts 17, 18 and cushioning means 20 desirably an endless structure associated with the supporting frame and including resilient deformable means 21, which latter means may be pneumatic tire 22 and wheel 23 structures positioned for contacting the ground 24 and being backed by the supporting frame 19 in a manner to effect two-way opposed deflection of the tires under ground-contact.

In the preferred construction, the supporting frame 19 is of stiff strong material such, for example, as steel alloy, aluminum alloy, magnesium alloy or other metal alloys having the desired physical characteristics and may be of cast, welded or other built-up assembled structure facilitating the provision of the desired strength and rigidity of the supporting frame. The supporting body means or frame 19 may be of elongated form including upper and lower straight portions 25, 26, respectively, of suitable thickness interconnecting rounded end portions 27, 28 of substantially the same thickness and providing desirably a substantially flat peripheral face. The supporting frame also includes transversely spaced-apart guide flange portions 29, 30 of substantial thickness projecting outwardly from the aforesaid face intermediate the width of the frame and extending along and throughout the periphery of the frame 19 defining a groove 31 therebetween and spaced-apart wheel tracks 32, 33 at such peripheral face.

To further strengthen and stiffen the supporting frame, there are provided a central reinforcing web 34 extending longitudinally throughout the extent of the supporting frame and transverse stiffening webs 35, 36, 37 disposed as shown in the drawings. If desired, the webs may have lightening holes for reducing the weight of the frame. The fore and aft stiffening webs 35 and 37 desirably include transverse housing portions 38, 39 each having a bore therein for receiving the journaled shafts 15, 16, to which shafts the struts 13, 14 are secured by fastening means such, for example, as set-screws 40. The webs 34 to 37, inclusive, are integrally united one to another and with the respective upper and lower straight portions 25, 26 and the rounded end portions 27, 28 of the supporting frame 19 facilitating the provision of the desired rigidity and strength especially to resist the distorting and twisting stresses due to landing operation of the aircraft on rough terrain.

The cushioning means 20 associated with the supporting frame 19 is preferably an endless structure construction and arrangement comprising a plurality of spaced-apart wheel structures 22, 23 in series at each of the tracks 32, 33 and disposed such that the resilient pneumatic tire elements 22, 22 are each in rolling contact with the peripheral face of the supporting frame. Transversely opposite wheel structures 22, 23 of the aforesaid series comprising the endless cushioning means 20 are aligned in pairs interconnected by axle means 41 including a common axle 42 and bearing means 43 for the adjacent wheels 23, 23 of each pair, which bearing means may be of the ball or roller type. Spaced-apart collars 44 suitably secured to the axle 42 may be provided for maintaining the desired spacing of the respective wheel structures 22, 23 for facilitating maintaining such wheel structures in alignment with the respective tracks 32, 33.

The invention provides link means 45 for the resilient deformable means 21 disposed between the respective series of wheel structures 22, 23 and operatively associated with the axle means 41 at each of the pairs of joined wheel structures thereby interconnecting such pairs of wheel structures in series for coincidental travel about and along the tracks 32, 33. Link means 45 includes alternate guide elements 46 disposed within the groove 31 at the guide flange portions 29, 30 and interconnected by links 47, as shown especially in Fig. 2. Each guide element and each link are provided with spaced-apart transverse apertures at their ends for receiving and embracing therein the respective axles 42, and such guide elements and links may be secured at the desired position on the axles 42 by any suitable mechanical fastening means which permits relative rotative movement between the links and guide elements.

The construction and arrangement of the supporting frame 19 and the cushioning means 20 is such that the endless cushioning structure of transversely and longitudinally interconnected wheel structures is freely movable peripherally as a unit about the supporting frame 19 permitting motion of translation of the respective pairs of rotating wheel structures relative to the supporting frame and to the ground 24 in the fore and aft direction of the aircraft, the guide elements 46 functioning to maintain continuous alignment of the wheel structures with the tracks 32, 33.

During such motion of translation, at least two and preferably four pairs of wheel structures 22, 23 are at spaced-apart positions along and beneath the supporting frame 19 for ground-contact, and the pneumatic tire elements 22 of each of such pairs of wheel structures, under load, are compressively deformed or deflected at opposite portions thereof inwardly toward their axial centers of rotation, such opposite portions being at the regions of contact with the tracks 32, 33 and the ground 24, whereby extensive yieldable deflection of the pneumatic tires in a two-way manner is provided for absorbing shock-loads and resiliently cushioning the aircraft during landing operations including motion of translation of the aircraft along the ground as in taxiing. Such relatively small pneumatic tire elements being inflated to relatively lower pressures and of relatively less massive construction as compared to those of the large single or dual-wheel landing structures, are thus resiliently and compressively deformed between the supporting frame and the supporting surface or ground 24 to a substantial extent at such opposite portions thereby also promoting relative softness of riding and landing qualities and accommodating unevenness of the ground.

While the landing gear may, if desired, be used in some applications without prerotating the wheel structures and/or premovement of the endless cushioning means 20 about the supporting frame, such operation may cause objectionable stresses in the wheel assembly 5 in addition to harmful scuffing and wear of the pneumatic tire elements by the abrasive action of the ground, especially upon ground-contact during the landing. For largely preventing such objectionable stresses and scuffing and wear of the tire elements and for facilitating braking the aircraft, there is provided driving-braking means 48 for braking and for positively moving the endless cushioning structure 20 peripherally about the supporting frame 19 facilitating uniformly prerotating the interconnected wheel structures including the tire elements at the desired rotative speed of revolution by virtue of their frictional contact with the tracks 32, 33 and such means 48. The driving-braking means 48 includes transversely spaced-apart endless flexible belts 49, 49 of leather, rubber or other suitable flexible material extending longitudinally of the supporting frame 19 opposite the upper straight portion 25 and being in substantially parallel outwardly spaced-apart relation with the tracks 32, 33 at the peripheral face of such upper portion. The respective belts 49, 49 are desirably each in driving frictional contact with at least two and preferably four pneumatic tire elements 22 and are arranged to press firmly against such tire elements.

To this end, each belt 49, 49 travels in a tensioned condition about and in contact with four longitudinally spaced-apart pulleys 50 to 53 of suitable metal or other stiff material mounted on rigid axles 54 to 57 carried by support brackets 58, 59. The pulleys 50 to 53 may be secured to the rigid axles 54 to 57 as by set-screws or other suitable mechanical fastening means and are further maintained at each of the axles 54 to 57 in the desired transversely spaced-apart relationship by a sleeve 61. Lateral shifting of the respective axles 54 to 57 may be prevented by collars 62, 63 and set-screws 64, 64 disposed adjacent the support brackets 58, 59. The support brackets 58, 59 are suitably secured to the supporting frame 19 desirably at the sides thereof as by suitable bolt connectors 65, 65. The arrangement is such that the respective series of pulleys 50 to 53 press the tensioned belts 49, 49 continuously against the pneumatic tire elements 22, 22 and especially in a manner to effect a relatively slight compressive deformation or deflection of such tire elements immediately at the respective pulleys thereby effectively maintaining driving-braking contact with such pneumatic tire elements. The respective belts 49, 49 and pulleys 50 to 53 thus coact with one another and with the four wheel structures in series at each of the tracks 32, 33 along the upper straight portion 25 in providing a positive driving-braking action for prerotating the wheel structures and driving the endless cushioning structure 20 in its motion of translation about the supporting frame 19.

The belts 49, 49 are positively driven by the end pulleys 50, 50 actuated by power-driving means 66 which may include a chain 67 and sprocket wheels 68, 69 and preferably an electric motor 70. The upper sprocket wheel 69 is fixedly secured in a suitable manner to the axle 54 between collars 60 and 63 and the lower sprocket wheel 68 is suitably secured to the shaft of the motor 70. The electric motor 70 is desirably reversible for driving the cushioning means 20 in the fore and the aft direction and may be mounted as by bolt connections 71 at the lower portions 26 of the supporting frame 19, being positioned within the space provided by the cutaway central web 34 between the lateral webs 36, 37.

The arrangement facilitates protecting the power-driving means 66 against accidental damage. The electric motor through suitable electrical controls may in addition to reversible rotation, be operated as an electrical generator whereby the motor provides for a braking action during its operation as a generator. The generated current may, if desired, be stored for use in the electrical system of the aircraft.

In the operation of the aircraft landing-gear in the landing position such that the supporting body means 19 and the cushioning means 20 associated therewith are disposed beneath the aircraft, as shown especially in Fig. 1, the endless cushioning structure including the respective series of interconnected-wheel structures 22, 23 and link means 45 is driven by the driving-braking means 66 such that the movement or motion of translation of the endless cushioning structure peripherally about the supporting body 19 is in the fore and aft direction, thereby also accomplishing prerotation of the wheel structures 22, 23 prior to their contact with the ground. The speed of rotation of the wheel structures and the rate of motion of translation of the endless cushioning means 20 are conveniently controlled by regulating the speed of the electric motor driving the belts 49, 49, the optimum speed and rate being such that there is little or no relative movement between the wheel structures of the endless means 20 and the ground at the moment of ground-contact upon landing, thereby eliminating to a large extent scuffing and slippage of the pneumatic tire elements 22 upon such ground-contact.

For forward travel of the aircraft, the positive driving action of the belts 49, 49 rapidly brings up to speed and drives the cushioning means 20 so that the four spaced-apart pairs of wheel structures contacting the upper straight portion 25 of the supporting frame 19 have a motion of translation relative to the frame 19 in the fore or direction of travel of the aircraft while the four spaced-apart pairs of wheel structures at the lower straight portion 26 have a motion of translation relative to the frame 19 in the aft direction or direction opposite that of the travel of the aircraft. Preferably, the speed of rotation of the respective wheel structures is such that there is little or no relative movement between the wheels and the ground at the instant of ground-contact.

The plurality of pairs of pneumatic-tire wheel structures, each wheel structure being of relatively small size as compared to that of conventional single or dual-wheel constructions, permit sustaining relatively great loads at relatively low inflating pressures, which facilitates providing softness of riding and landing qualities without objectionable shock-transmittal to the aircraft, while at the same time making possible the desired cushioning action under deflection of the wheel structures at their opposite zones of contact with the ground and with the supporting frame to withstand relatively severe shock-loads. The pairs of wheel structures contacting the ground at a given instant are resiliently compressed between the ground and the supporting frame 19 at opposite portions of the tires 22, 22 in a two-way deflecting manner thereby accommodating the shock-loads and impact stresses of the landing and distributing the load to the ground at a plurality of spaced-apart regions longitudinally of the landing gear. Such distribution of the load at a plurality of substantially-extensive areas of the pneumatic tires results in low stress per unit area of contact with the ground or supporting surface of a runway, which minimizes objectionable breakage of the supporting surface or sinking into relatively soft and/or loose ground. The safety of the aircraft is promoted by such resistance to sinking into soft ground which sinking tends to cause "nosing over" of the aircraft.

The resilient deformability of the low-pressure pneumatic tires facilitates the accommodation of the wheel assembly 5 to relative unevenness of the surface of the ground while effectively cushioning and absorbing shock-loads and impact stresses resulting during the landing operation. Severe shock-loads and impact of stresses not wholly absorbed by the cushioning action of the endless cushioning means 20 may be transmitted through the struts 13, 14 to the shock absorbers 17, 18 which cooperate with the wheel assembly 5 for further absorbing such loads and impact stresses and preventing their transmittal to the aircraft structure itself.

An additional advantage of the described construction resides in the fact that failure through puncturing, for example, of one or more of the pneumatic tire elements 22 does not substantially hinder the effective operation of the landing-gear which further enhances the safety of the operation of the aircraft.

The desired braking action may be applied to the respective series of interconnected wheel structures 22, 23 by so controlling the electric motor that it operates as a generator thereby effecting a retarding force transmitted through the chain and sprocket-wheel drive and pulleys on the movement of the belts 49, 49, which belts being pressed against the pneumatic tires 22, 22 with little or no slippage therebetween retard the rotative movement of the wheel structures. The driving-braking means 48 in combination with the other parts of the wheel assembly 5 facilitates providing a free-wheeling or over-running clutch action responsively accommodating sudden surges in the motion of translation of the endless cushioning means 20, which surges may occur in case of too great a difference between rate of peripheral movement of the endless cushioning means and the speed of the aircraft relative to the ground.

A further advantage is that the construction facilitates taxiing of the aircraft since each wheel assembly may be independently operated through the control of the power-driving means 66. Each wheel assembly 5 of a plurality thereof may have the same or different speeds of rotation of the endless cushioning means 20 in the same or opposite direction for facilitating maneuvering the aircraft on the ground and even moving the aircraft backwardly, when desired.

Thus, the invention provides a relatively simple yet rugged construction effective for absorbing shock-loads and resiliently cushioning the aircraft upon ground-contact while facilitating desirable prerotation of the respective wheel structures prior to such ground-contact for largely eliminating scuffing and abrasive action on the pneumatic tires. The construction is also effective in maintaining the respective wheel structures at the desired spaced-apart positions peripherally of the supporting frame 19 and also in position for continuity of contact with the tracks 32, 33 further assuring satisfactory operation of the landing-gear.

Variations may be made without departing from the scope of the invention as it is defined in the following claims.

I claim:

1. A vehicle wheel assembly comprising supporting body means for association with the vehicle in a manner effecting suspension of the vehicle from the ground, endless cushioning means surrounding said body means for contacting said ground and mounted for motion of translation relative to said body means about the latter means facilitating travel of said vehicle in its fore and aft direction, said cushioning means comprising a plurality of spaced-apart rotatable wheel structures including resilient deformable elements interconnected in series and extending about said body means and being disposed for backing support by said body means and for contacting said ground such that opposite portions of the deformable elements contacting the ground during said motion of translation are compressively deformed toward one another between said body means and said ground under load to facilitate resiliently cushioning the vehicle and distributing such load to the ground over an extended area of the latter, and means for driving said cushioning means in said motion of translation about said body means, the driving means comprising belt means in frictional driving relation with at least two of said wheel structures.

2. A vehicle wheel assembly comprising elongated supporting body means for association with the vehicle in a manner effecting suspension of the vehicle from the ground and having a peripheral face providing a pair of tracks spaced-apart transversely of said body means and extending longitudinally wholly about said body means, an endless cushioning structure surrounding said body means in register with said tracks for contacting the ground and mounted for motion of translation relative to said body means peripherally about said tracks facilitating travel of said vehicle in its fore and aft direction, said structure comprising a series of longitudinally spaced-apart rotatable wheel structures including resilient pneumatic tire elements at each of said tracks in contact therewith and extending entirely about said body means, each series of said wheel structures being pivotally interconnected and being interconnected to one another such that opposite wheel srtuctures are transversely aligned in pairs and said wheel structures being disposed for backing support by said body means at said tracks and for contacting the ground such that opposite portions of said pneumatic tire elements of the pairs of said wheel structures contacting the ground during said motion of translation are compressively deformed toward one another between said tracks and said ground under load to facilitate resiliently cushioning the vehicle and distributing such load to the ground at a plurality of positions along said body means, means for so interconnecting and disposing said series of wheel structures, guide means for maintaining each said series of wheel structures in alignment with its associated track during said motion of translation of said endless cushioning structure, and driving-braking means for driving said cushioning structure in said motion of translation and for retarding the speed of said motion of translation, said driving-braking means comprising reversible electric motor driving means and belt means driven by said motor means in frictional driving contact with the pneumatic tire elements of a plurality of said wheel structures.

3. An aircraft landing-gear comprising a pair of supporting struts spaced apart in the fore and aft direction of the aircraft and extending generally downward from the aircraft in the landing position and a wheel assembly pivotally carried by said struts, said wheel assembly comprising an elongated supporting frame including upper and lower straight portions interconnecting rounded end portions providing a peripheral face and said supporting frame including transversely spaced-apart guide flange portions projecting outwardly from said face intermediate the width thereof and extending along said face throughout the periphery thereof defining a peripheral groove and spaced-apart tracks, means for attaching said supporting frame to said struts in a pivotal manner, a plurality of spaced-apart wheels including resilient pneumatic tire elements in series surrounding said supporting frame at each of said tracks and in rolling contact with the latter, axle means for rotatively mounting said wheels and interconnecting opposite wheels at each track in pairs, link means between said series of wheels operatively associated with said axle means at each of said pairs of wheels and pivotally interconnecting said pairs of wheels in series for coincidental travel thereof along said tracks, said link means including guide elements disposed in said groove between said guide flange portions for maintaining said wheels on said tracks during said travel thereof, and electrical driving-braking means including belt means spaced-apart from and opposite said upper straight portion of said supporting frame in driving contact with the peripheral surfaces of at least two of said pairs of wheels opposite their regions of contact with said tracks for driving the wheels of each series along said tracks and for braking the wheels of each series, at least two of said pairs of wheels being at said lower straight portion of said supporting frame for ground-contact during landing operation of the aircraft, said tire elements of the latter said two pairs of wheels, under load, being deflected inwardly relative to said axle means at their opposite regions of contact with said tracks and the ground for resiliently cushioning the aircraft.

4. An aircraft landing gear for cushioning support of the aircraft during landing and take-off and on the ground, said landing gear comprising a supporting body having a surface in upper and lower portions joined fore and aft in a peripheral manner, a plurality of pairs of wheels each pair being transversely aligned and spaced-apart and having pneumatic tires thereon, means for interconnecting said pairs of wheels for movement of said tires in an endless peripheral series about said surface, said tires when in contact with the ground being disposed for support of said body by rotation of the pairs of tires in succession along the bottom portion of said surface and by deflection of said pairs of tires pneumatically both at the bottom of the tires against the ground and at the top thereof against said surface, and guide means between said pairs of tires for maintaining said tires in alignment with said surface during the movement of the tires.

5. An aircraft landing gear for cushioning support of the aircraft during landing and take-off and on the ground, said landing gear comprising an elongated supporting body having a substantially flat surface in upper and lower portions joined fore and aft by curved surfaces in a peripheral manner, a plurality of pairs of wheels each pair being transversely aligned and spaced-apart and having pneumatic tires thereon, means for interconnecting said pairs of wheels for movement of said tires in an endless peripheral series about said surface, said tires when in contact with the ground being disposed for support of said body by rotation of the pairs of tires in succession along the bottom surface portion and by deflection of said pairs of tires pneumatically both at the bottom of the tires against the ground and at the top thereof against said surface, and guide means between said pairs of wheels in engagement with the interconnecting means for maintaining the pairs of tires in alignment with said surface during the movement of the tires.

6. An aircraft landing gear for cushioning support of the aircraft during landing and take-off and on the ground, said landing gear comprising an elongated supporting body having a substantially flat surface in upper and lower portions joined fore and aft in a peripheral manner, a plurality of wheels having pneumatic tires thereon, means for interconnecting said wheels for movement of said tires in an endless peripheral series about said surface, said tires when in contact with the ground being disposed for support of said body by rotation of the tires in succession along the bottom portion of said surface and by deflection of said tires pneumatically both at the bottom of the tires against the ground and at the top thereof against said surface, guide means for maintaining said tires in alignment with said surface during the movement of the tires, and belt-driving means frictionally engaging said tires.

JOHN P. SAPP.

REFERENCES CITED

The following references are of record in the file of this patent:

UNITED STATES PATENTS

| Number | Name | Date |
| --- | --- | --- |
| 2,169,443 | Burke | Aug. 15, 1939 |
| 2,281,351 | Dowty | Apr. 28, 1942 |
| 2,351,799 | Austin | June 20, 1944 |
| 2,383,754 | Watt | Aug. 28, 1945 |
| 2,391,952 | Dever | Jan. 1, 1946 |
| 2,394,472 | Pecker | Feb. 5, 1946 |

FOREIGN PATENTS

| Number | Country | Date |
| --- | --- | --- |
| 156,960 | Great Britain | Jan. 20, 1921 |
| 383,618 | Great Britain | June 20, 1944 |